United States Patent
Medvinsky et al.

(10) Patent No.: US 7,237,108 B2
(45) Date of Patent: Jun. 26, 2007

(54) ENCRYPTION OF STREAMING CONTROL PROTOCOLS AND THEIR HEADERS

(75) Inventors: Alexander Medvinsky, San Diego, CA (US); Petr Peterka, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 714 days.

(21) Appl. No.: 10/183,130

(22) Filed: Jun. 25, 2002

(65) Prior Publication Data

US 2003/0065917 A1 Apr. 3, 2003

Related U.S. Application Data (63) Continuation-in-part of application No. 09/966,552, filed on Sep. 26, 2001.

(51) Int. Cl.
H04L 9/00 (2006.01)
H04N 7/167 (2006.01)

(52) U.S. Cl. ...................... 713/160; 380/200
(58) Field of Classification Search .............. 713/160; 380/200
See application file for complete search history.

(56) References Cited

U.S. PATENT DOCUMENTS

| 5,455,953 A | 10/1995 | Russell |
| 5,535,276 A | 7/1996 | Ganesan |
| 6,189,146 B1 | 2/2001 | Misra et al. |
| 6,389,541 B1 | 5/2002 | Patterson |
| 6,591,250 B1 | 7/2003 | Johnson et al. |
| 6,615,258 B1 | 9/2003 | Barry et al. |
| 2002/0047899 A1* | 4/2002 | Son et al. .................. 348/114 |
| 2002/0049679 A1 | 4/2002 | Russell et al. |
| 2002/0099948 A1 | 7/2002 | Kocher et al. |
| 2002/0133699 A1* | 9/2002 | Pueschel .................. 713/153 |
| 2002/0172368 A1 | 11/2002 | Peterka |
| 2003/0005144 A1 | 1/2003 | Engel et al. |

(Continued)

FOREIGN PATENT DOCUMENTS

EP 1041823 A 10/2000

(Continued)

OTHER PUBLICATIONS

Real Time Streaming Protocol (Request for comments:2326).*

(Continued)

Primary Examiner—Emmanuel L. Moise
Assistant Examiner—Ali Abyaneh
(74) Attorney, Agent, or Firm—Thomas Bethea, Jr.

(57) ABSTRACT

A method for securely streaming real-time content from a caching server to an authorized client. The method includes the steps of encrypting an RTSP (real-time streaming protocol) message having a header and a payload, the RTSP message being encrypted in its entirety; and providing a first clear header for the encrypted RTSP message. Further, the method includes the steps of encrypting an RTCP (real-time control protocol) message having a header and a payload, the RTCP message being encrypted in its entirety; and providing a second clear header for the encrypted RTCP message. Thereafter, the encrypted RTSP message and the first clear header are transmitted, and the encrypted RTCP message and the second clear header are transmitted in order to securely stream the real-time content from the caching server to the authorized client.

17 Claims, 5 Drawing Sheets

U.S. PATENT DOCUMENTS

| | | |
|---|---|---|
| 2003/0046238 A1* | 3/2003 | Nonaka et al. ............... 705/51 |
| 2003/0236745 A1 | 12/2003 | Hartsell et al. |
| 2005/0216731 A1 | 9/2005 | Saito et al. |

FOREIGN PATENT DOCUMENTS

| | | |
|---|---|---|
| EP | 1041823 A2 * | 10/2000 |
| EP | 1089488 | 4/2001 |
| WO | WO 00/11849 A1 | 3/2000 |
| WO | WO 01/56249 A1 | 8/2001 |
| WO | WO 01/98903 A1 | 12/2001 |
| WO | WO 01/99374 A2 | 12/2001 |
| WO | WO 01/99374 A3 | 12/2001 |
| WO | WO 02/45316 A2 | 6/2002 |
| WO | WO 02/45316 A3 | 6/2002 |
| WO | WO 02/84980 A1 | 10/2002 |
| WO | WO 03/45036 A2 | 5/2003 |

OTHER PUBLICATIONS

A Transport protocol for Real Time Applications (request for comments: 1889).*

Christin, Nicolas; "Multicasting of Real-Time Data RTP, RTCP, RTSP"; 'Online! Nov. 9, 1999, Retrieved from the Internet: , URL:http://www.sims.berkeley.edu/[christin/talks/rtp.pdf> retrieved on Nov. 3, 2003.

Ganesan, R.; "Yaksha: Augmenting Kerberos with Public Key Cryptography", Network and Distributed System Security, 1995., Proceedings of the Symposium on San Diego, CA USA Feb. 16-17, 1995, Los Alamitos, CA, USA, IEEE Comput. Soc. Feb. 16, 1995, ISBN: 0-8186-7027-4; pp. 132-143.

Schulzrinne, H., et al.; "RTP: A Transport Protocol for Real-Time Applications"; RFC 1889; 'Online! XP002260412; Retrieved from the Internet: ,URL:www.ietf.org>; retrieved on Nov. 3, 2003.

Aura, Tuomas, "Distributed Access-Rights Management With Delegation Certificates," Secure Internet Programming (LNCS 1603), pp. 211-235, 1999.

Kohl, J et al., "The Kerberos Network Authentication Service (V5)," 97 pages, Sep. 1993.

Maughan, D. et al., "Internet Security Association And Key Management Protocol (ISAKMP)," The Internet Society, 81 pages, Nov. 1998.

* cited by examiner

ENCRYPTION OF STREAMING CONTROL PROTOCOLS AND THEIR HEADERS

CROSS-REFERENCES TO RELATED APPLICATIONS

This application is related to the following U.S. non-provisional applications, U.S. patent application Ser. No. 10/194,922, entitled "KEY MANAGEMENT INTERFACE TO MULTIPLE AND SIMULTANEOUS PROTOCOLS" filed, Jul. 12, 2002; U.S. patent application Ser. No. 10/092,347, entitled "KEY MANAGEMENT PROTOCOL AND AUTHENTICATION SYSTEM FOR SECURE INTERNET PROTOCOL RIGHTS MANAGEMENT ARCHITECTURE" filed Mar. 4, 2002; U.S. patent application Ser. No. 10/170,951, entitled "ACCESS CONTROL AND KEY MANAGEMENT SYSTEM FOR STREAMING MEDIA" filed Jun. 12, 2002; U.S. patent application Ser. No. 09/966,552, entitled "UNIQUE ON-LINE PROVISIONING OF USER SYSTEMS ALLOWING USER AUTHENTICATION" filed Sep. 26, 2001; and U.S. patent application Ser. No. 10/153,445, entitled "ASSOCIATION OF SECURITY PARAMETERS FOR A COLLECTION OF RELATED STREAMING PROTOCOLS: RTP, RTSP, RTCP" filed May 21, 2002; and to U.S. Provisional Application Ser. No. 60/334,721 entitled "SCALABLE DRM ARCHITECTURE" filed Nov. 15, 2001; all of which are hereby incorporated by reference in their entirety as set forth in full in the present invention, for all purposes.

BACKGROUND OF THE INVENTION

The present invention relates generally to the field of data communication and more specifically to rights management and securing data communicated in a network.

A growing interest in streaming distribution of multimedia content over Internet Protocol (IP) networks has resulted in a growing need for key management systems. One such streaming distribution system is the Aerocast Network™ developed by Aerocast, Inc. of San Diego, Calif. As discussed with reference to FIG. 1, although the existing phase 1 Aerocast Network facilitates delivery of content, it lacks security and key management for the network.

Figure 1:
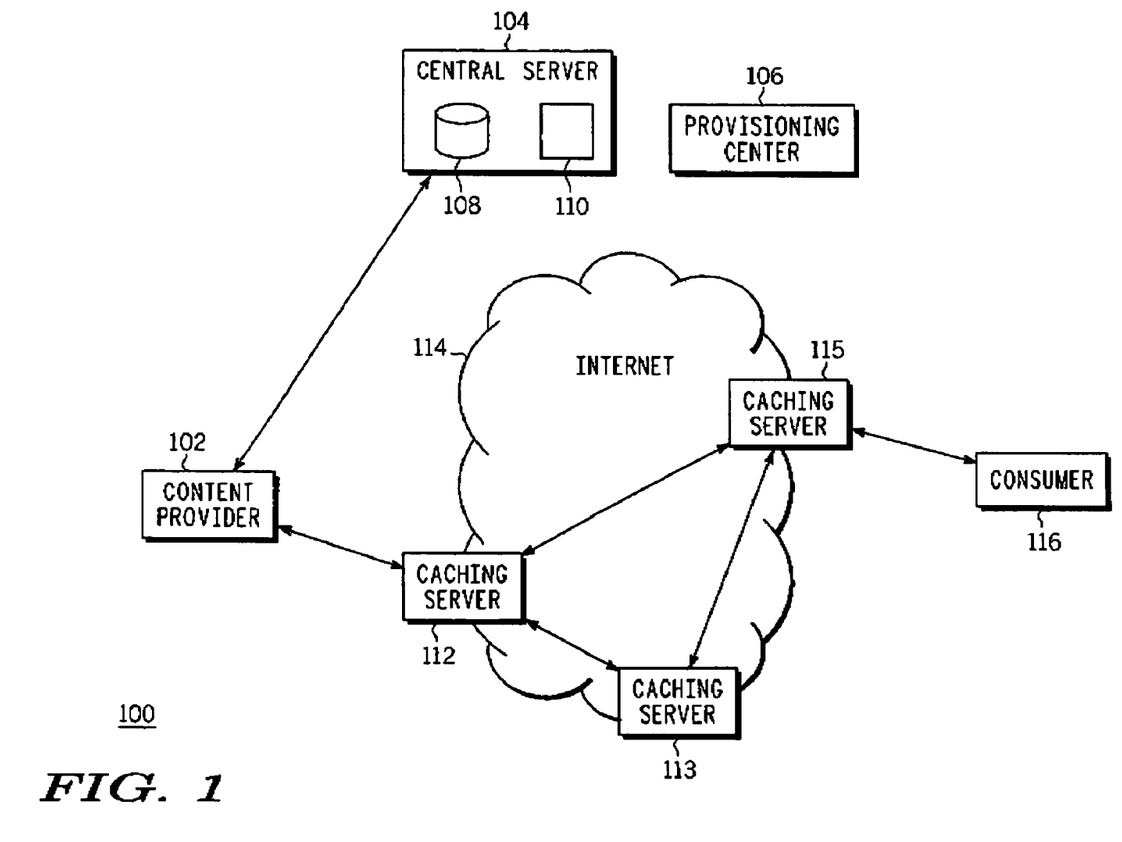
FIG. 1 is a block diagram of a network for facilitating streaming of content over a communication network.

FIG. 1 is a block diagram of a network 100 (by Aerocast) for facilitating streaming of content over a communication network.

Among other components, network 100 includes a content provider 102 for generating content intended for a consumer 116, Internet 114 through which content is streamed, and a central server 104 to which content provider 102 publishes its contents. Central server 104 contains a database 108 for storing content information, and a search engine 110 for searching database 108. Network 100 further comprises a provisioning center 106, and caching servers 112, 113 and 115.

In operation, consumer 116 wishing to access content by content provider 102, streams the content from the closest caching server, in this case, caching server 115. In conventional systems without caching servers, consumer 116 desiring such content streams obtains content directly from content provider 102. Not only does this result in poor content quality, delays associated with inadequate bandwidth may result. By using the caching servers, network 100 avoids disadvantages associated with direct streaming of digital content from content provider 202. Caching servers 112, 113 and 115 may be local DSL (digital subscriber line) providers, for example.

Network 100 provides a further advantage. When searching for content, consumer 116 need not search any and all databases on Internet 114. All content providers (including content provider 102) on network 100 publish descriptions of their content to a single central database 108. For video content for example, such descriptions may include the movie name, actors, etc. In this manner, when content is desired, consumer 116 uses search engine 110 to search database 108. When the content is found, database 108 thereafter provides a link to content provider 202 having the desired content. Content provider 102 is then accessed by consumer 116 to access the desired content in more detail. Such details include pricing information, etc.

A mechanism is provided whereby consumer 116 provides a list of caching servers closest to it to content provider 102. In response to consumer 116's request, content provider 102 selects the appropriate caching server closest to consumer 116 for streaming the content. It should be observed, however, that in today's Aerocast network content is streamed in the clear by network 100. Disadvantageously, because it is unprotected, the content may be intercepted by an unauthorized consumer resulting in substantial losses to content providers and consumers.

Some of the disadvantages of network 100 are resolved by the above mentioned related U.S. Patents, commonly owned and hereby incorporated by reference as if set forth in its entirety in the present specification.

Generally, to deliver, manage and control streaming content, several different protocols may be employed. For example, a collection of protocols namely RTP (real time protocol), RTCP (real time control protocol) and RTSP (real time streaming protocol) may be employed for streaming real-time data. RTP specified in RFC (request for comments) 1889 runs on top of UDP (user datagram protocol). Among other functionalities, RTP provides end to end transport functions for real time transmission of content such as audio and video over point to point or multicast services. RTCP (Real Time Control Protocol) is a companion protocol providing QoS (quality of service) monitoring and delivering statistics on the media stream session, which may be used by the sender to adjust its timing. In addition, at least in a point-to-point case (and possibly in the multicast case) RTP and RTCP are accompanied by RTSP (Real Time Session Protocol), used to request particular content, provide content description, pause and re-start the media stream for point-to-point connections, etc.

Conventionally, a user wishing to stream content using the collection of protocols begins by generating RTSP messages, each RTSP message having a header and a payload. The RTSP header for each payload contains content identification (RTSP URL) for the content that is being requested or played out. Disadvantageously, the user's viewing patterns can be observed in this manner. One technique for preventing this outcome is by encrypting the entire RTSP message including the header.

Conventionally, this would require a security implementation at a lower layer, such as IPSec (Internet Protocol Security). While IPSec is capable encrypting a whole IP packet, it does require support from the operating system. Even if the disadvantage of requiring an operating system is overcome, IPSec is relatively complex and difficult to administer. Another option is to employ SSL (Secure Sockets Layer)or TLS (Transport Layers Security) for encrypting the entire RTSP message. However, both SSL and TLS are inoperable over a UDP (User Datagram Protocol)-based transport. Therefore, SSL and TLS cannot be used to secure RTCP. In any event, disadvantageously, IPSec, SSL and TLS all come with key management systems that lack efficiency and scalability.

Therefore, there is a need to resolve the aforementioned problems and the present invention meets this need.

SUMMARY OF THE INVENTION

According to a first aspect, this invention is a method for securing protocols associated with streaming of real time data. Examples of such protocols are RTCP (real time control protocol) and RTSP (real time streaming protocol). Note that other such protocols may be secured using the present invention.

These protocol messages typically include a header and a payload. The present invention encrypts the entire header and payload of the protocol messages to provide secure streaming of the real-time data. Specifically, one or more security parameters (i.e. encryption keys) are used for encrypting the header and the payload.

Further, the messages may be encrypted at various layers. In one aspect, preferably, the protocol messages are encrypted at the application layer. In another aspect, the messages are encrypted at the lower layers. After encryption, a new clear header is provided for each message. This header contains information about the security parameters used for encrypting the messages. At the receiving end, the security parameters are retrieved from the clear header, and used for decrypting the encrypted protocol message.

According to another aspect, the present invention discloses a method that securely streams the real-time content from a caching server to an authorized client. Note that the caching server receives the content from the content provider for forwarding to the authorized client. In one aspect, the method specifically employs RTSP and RTCP protocol messages for securely streaming the content. The method begins by encrypting the RTSP message including its header and payload. In this manner, content identification in the header is protected. Next, a new header is provided for the encrypted RTSP message. This header is clear and may contain various information. For example, the clear header may include an identifier for identifying one or more security parameters for decrypting the encrypted RTSP messages. In another aspect, the clear header may include a sequence number for preventing replay of prior RTSP messages.

Similarly, the RTCP is encrypted and a clear header provided. This header includes the same identifier associated with the cryptographic keys for securing the RTSP message. Thereafter, the encrypted RTSP, RTCP messages and their corresponding headers are exchanged between the client and the caching server for the purpose of securing the data streaming session. At the receiving end, the encrypted messages are decrypted by retrieving the identifier from the headers and determining the cryptographic keys. These cryptographic keys are then used for decrypting the messages. In this manner, the present invention secures the RTSP and RTCP protocols in order to secure the data streaming session.

According to another aspect of the present invention, a method of encrypting RTCP and RTSP messages for securely delivery of real-time data is disclosed. The method may be used in a communication network that employs RTP (real time protocol), for example. The method includes the steps of determining two or more security parameters for securing delivery of the real-time data. At the application layer, the security parameters are then used for encrypting the entire payload and header of the RTSP and RTCP messages. Further, the client and caching server exchange the RTSP message, the RTCP message and the RTP message for securely delivering the real-time data.

A further understanding of the nature and advantages of the present invention herein may be realized by reference to the remaining portions of the specification and the attached drawings. References to "steps" of the present invention should not be construed as limited to "step plus function" means, and is not intended to refer to a specific order for implementing the invention. Further features and advantages of the present invention, as well as the structure and operation of various embodiments of the present invention, are described in detail below with respect to the accompanying drawings. In the drawings, the same reference numbers indicate identical or functionally similar elements.

DETAILED DESCRIPTION OF THE INVENTION

A method employed in an IPRM (Internet protocol rights management) system utilizing the streaming protocols RTCP (real time control protocol) and RTSP (real time streaming protocol) for securing real-time content control protocols is taught. Among other advantages, the method allows client viewing preferences and subscriber identity to be protected from snooping. This method also prevents control message manipulation attacks by authenticating control messages associated with a content streaming session. Otherwise, unauthorized control message manipulation by a man-in-the-middle can lead to disruption of service, streaming of the wrong content or of the correct content but in the wrong format and may result in customer dissatisfaction. When the real-time data is to be secured, the entire header and payload of the RTCP and RTSP messages are encrypted and exchanged, where an RTSP header usually contains a URL that identifies the content and where RTCP messages can contain subscriber identifying information such as an email address. Not only does this process occur at the application layer, identical formats are used to encrypt the RTCP and RTSP messages to secure the real-time data.

Figure 2:
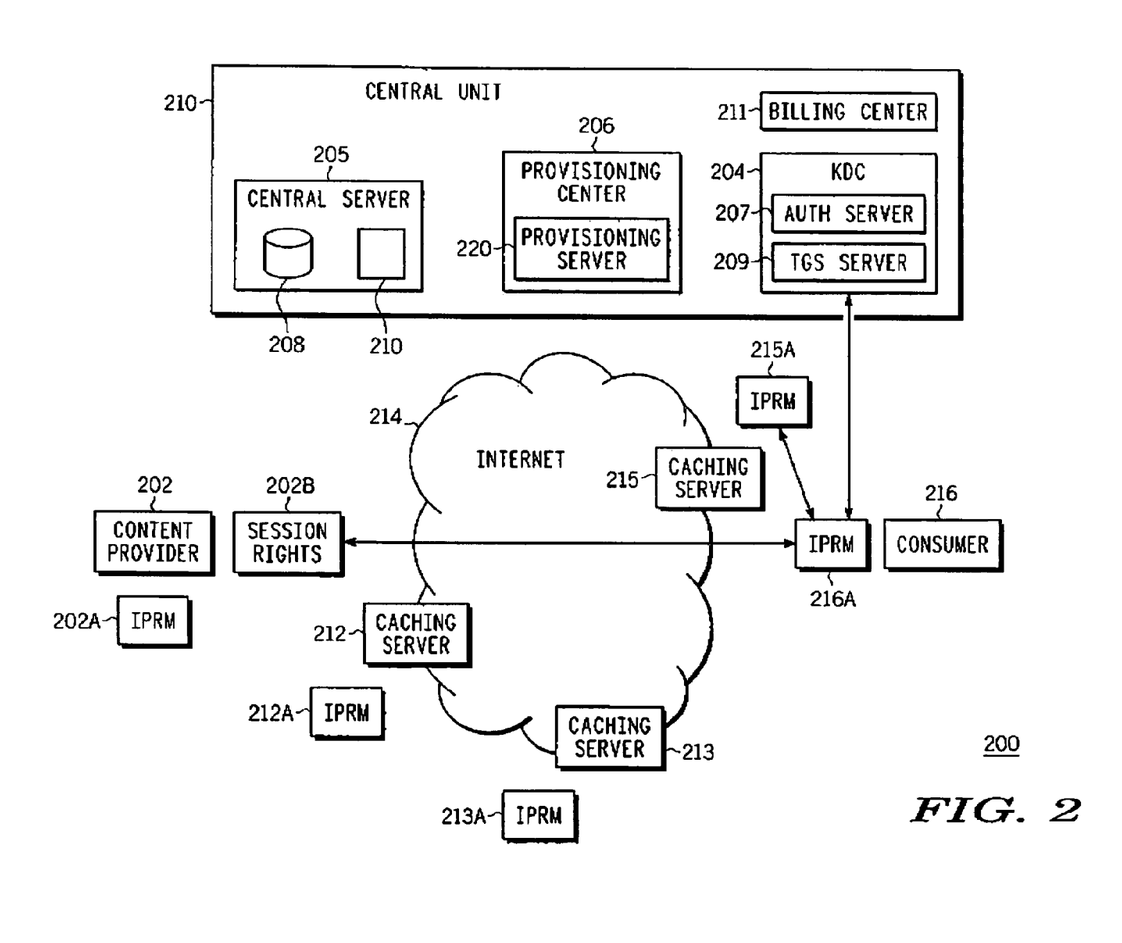
FIG. 2 is a block diagram of an IPRM (Internet protocol rights management) system incorporating the ES Broker™ protocol for applying key management and security to the network of FIG. 1 in accordance with an exemplary embodiment of the present invention.

FIG. 2 is a block diagram of an IPRM (Internet protocol rights management) system 200 incorporating the ESBroker™ protocol for applying key management and security to network 100 of FIG. 1 in accordance with an exemplary embodiment of the present invention.

Among other components, IPRM system 200 comprises a content provider 202, consumer 216, Internet 214, a provisioning center 206, a central server 205 that contains both a database 208 and a search engine 210, caching servers 212, 213 and 215 all of which function in a similar manner to those of the corresponding components in FIG. 1. In addition, IPRM system 200 comprises a KDC (key distribution center) 204 containing an AS (authentication server) 207 for issuing a TGT (ticket granting ticket) to consumer 216, a TGS (ticket granting server) 209 for providing server tickets to access particular servers, a provisioning server 220, and a billing center 211. KDC 204, billing center 211, provisioning center 206 and central server 205 are all located within a central unit 218 for facilitating provision of services within IPRM system 200.

Further, IPRM system 200 contains an IPRM agent 202A for administering rights management for content provider 202, a session rights object 202B containing user selections and optionally content access rules for the content to be streamed, an IPRM agent 212A for administering rights management for caching server 212, IPRM agent 213A for administering rights management for caching server 213, IPRM agent 215A for administering rights management for caching server 215, IPRM agent 216A for administering rights management for consumer 216, and a viewer (not shown) within consumer 216 for receiving desired content. Although not shown, the foregoing components may be located within their associated components. For example, IPRM agent 202A is locatable within content provider 202 rather than externally as shown.

As noted, IPRM system 200 generally functions to facilitate streaming of content in a secure fashion, to consumer 216 by using caching servers 212, 213 and 215. Content provider 202 provides content only once and thereafter it can be moved among the caching servers. The reason for the caching servers are to move the content closer to the edges of IPRM system 200. This improves the streaming performance and allows smaller content providers to sell their content without the need to buy expensive hardware for media streaming. It also allows introduction of an IP multicast (communication between a single sender and multiple receivers on a network) only at the caching servers. With current technology it is easier to have an IP multicast limited to a local access network than to have an IP multicast over the Internet.

The present invention in accordance with a first embodiment provides security to IPRM system 200 via KDC 204, IPRM agents 202A, 212A, 213A, 215A, and 216A. The IPRM agents in conjunction with KDC 204 and provisioning center 206 provide authentication, privacy, integrity and access control tools to all aspects of IPRM system 200. For example, before a consumer can utilize the system for streaming content, a registration process is required. Secure registration for the consumer is provided by IPRM system 200. Thus, during the registration process, no one else may replicate the identity of consumer 216 by intercepting messages between consumer 216 and KDC 204. KDC 204 is a trusted entity and provides key distribution to network components using a blend of symmetric and asymmetric algorithms.

KDC 204 and the IPRM components may be purely software protection, with a limited trust placed upon consumer 216's, or may be hardware security modules, which may be mandatory to obtain rights to high quality content from copyright owners requiring high security levels, or may be a combination of both software and hardware. IPRM uses an authenticated key management protocol with high scalability to millions of consumers. The key management protocol is called ESBroker™ (Electronic Security Broker), a product of Motorola, Inc., San Diego Calif., will be referenced throughout this specification.

The ESBroker™ protocol partly based on the Kerberos framework consists of client interactions with the centralized Key Distribution Center (KDC 204) as well as with the individual application servers. A KDC client is any host that can send requests to the KDC. Within the IPRM system this includes consumers, caching servers and other IPRM system components. An application server is any server registered with the KDC for which a client might request a service ticket (e.g. caching server, Billing Center, etc.).

As used herein, a ticket is an authentication token that is given out to a client by the KDC. Among other information, a ticket contains the name of the client, name of a specific server and a session key (a symmetric encryption key). The same host may be both a KDC client and an application server at the same time. For the IPRM system 200, the protocol employs a series of messages to accomplish key management between client and server interfaces of the system. This key management protocol is intended to be of general use for establishing secure sessions and is not restricted to the IPRM system. These messages listed in Table 1 below, are further described in the section entitled IPRM Protocol Messages.

TABLE 1

| Code | Message Type | Description |
| --- | --- | --- |
| 1 | CLIENT_ENROLL_REQ | Client enrollment request, containing client public key and other attributes |
| 2 | CLIENT_ENROLL_REP | Client enrollment reply from KDC 204, possibly containing a client certificate for the public key. |
| 3 | AS_REQ | Request Ticket Granting Ticket from the Authentication Server |
| 4 | AS_REP | Reply from Authentication Server with the TGT |
| 5 | TGS_REQ | Request service ticket from TGS server 209 |
| 6 | TGS_REP | Reply from TGS server 209 with the service ticket |
| 7 | TKT_CHALLENGE | Server requests this client to initiate key management |
| 8 | KEY_REQ | Key Management request from client |
| 9 | KEY_REP | Key Management reply from the application server |
| 10 | SEC_ESTABLISHED | An ACK from client to an application server stating that security is established |
| 11 | ESB_ERR | Error reply message |
| 12 | INIT_PRINCIPAL_REQ | Create a Provisioning Ticket for a specified principal. If the specified principal doesn't already exist, it will be initialized in KDC 204 database. |
| 13 | INIT_PRINCIPAL_REP | Returns a Provisioning Ticket for the specified principal. |
| 14 | DELETE_PRINCIPAL_REQ | Delete a specified ESBroker™ principal from KDC 204 database. |
| 15 | DELETE_PRINCIPAL_REP | Acknowledgment to DELETE_PRINCIPAL_REQ |
| 16 | SERVICE_KEY_REQ | Application server requests a new service key from KDC 204. |
| 17 | SERVICE_KEY_REP | KDC 204 returns a new service key to the application server. |

TABLE 1-continued

| Code | Message Type | Description |
|---|---|---|
| 18 | AUTH_DATA_REQ | KDC 204 requests authorization data for a particular principal. This may be part or all of the authorization data that will appear in a ticket that KDC 204 subsequently issues. |
| 19 | AUTH_DATA_REP | Authorization Server returns the data requested with AUTH_DATA_REQ. |

In operation, the key management process between a client and a server is classified two phases: (1) a generic phase in which a client is in contact with KDC 204 to obtain a server ticket to access the server; and (2) a non-generic phase in which the client uses the server ticket to form a KEY_REQ (key request) message to the server. In the non-generic phase, a DOI (domain of interpretation) object containing information that is specific to a particular application of a general ESBroker key management protocol (e.g. specifically for the IPRM System). For example, in a key management process between consumer 216 (client) and caching server 215 (server), the generic phase involves obtaining, by consumer 216, a server ticket from KDC 204 for accessing caching server 215. The non-generic process involves using the server ticket to generate the KEY_REQ message for accessing caching server 215, wherein the KEY_REQ contains the DOI object that contains the Session Rights. Furthermore, which messages are used in the protocol depend on whether key management is client or server initiated. If server initiated, the TKT_CHALLENGE (ticket challenge) message is employed in addition to other messages as more clearly shown with reference to FIG. 4.

Figure 3:
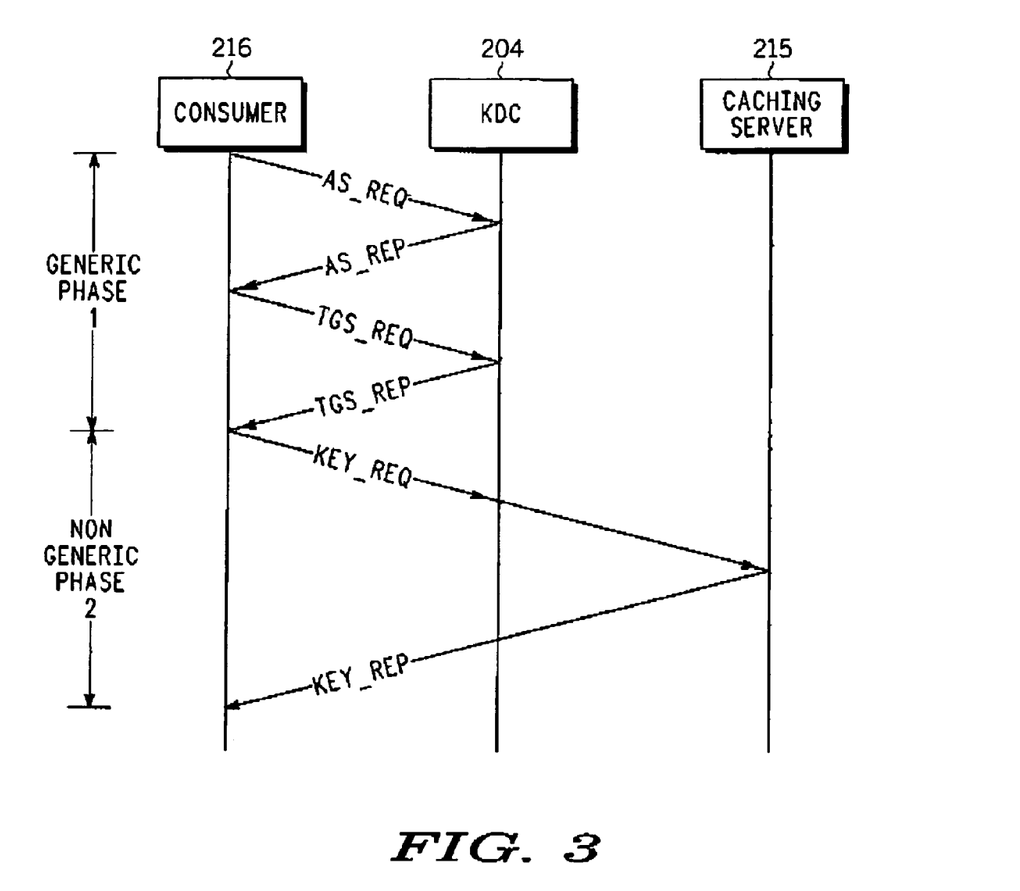
FIG. 3 is a high-level flow diagram of the security and key management protocol when key management is initiated by a consumer (client) to a caching server (server) in accordance with an exemplary embodiment of the present invention.

FIG. 3 is a high-level flow diagram of the security and key management protocol when key management is initiated by consumer 216 (client) to caching server 215 (server) in accordance with an exemplary embodiment of the present invention.

As shown, consumer 216 wishing to stream content from caching server 215 in a secure manner initiates the key management process. This is done by transmitting an AS_REQ message to KDC 204 to obtain a TGT (ticket granting ticket) for TG server 209. The AS_REQ message contains the consumer 216's identity, KDC 204's identity, more specifically the KDC realm or administrative domain, and a nonce to tie it to a response. It may also contain a list of symmetric encryption algorithms that are supported by consumer 216. Of course, it is assumed that both consumer 216 and caching server 215 have been registered by KDC 204 which acts as a trusted authenticator and can verify the identity of both nodes.

As shown, in response to the AS_REQ message, KDC 204 validates the TGT request, checks with provisioning server 220 for validity of consumer 216 and thereafter responds with an AS_REP message containing the TGT. It should be noted that the private portion of the TGT is encrypted with KDC 204's service key known only to KDC 204. The same KDC 204 service key is also used to authenticate the TGT with a keyed hash. Since consumer 216 does not know KDC 204 service key, it cannot modify it and cannot read the private part of the ticket. Because consumer 216 still needs to know the session key for subsequent authentication to KDC 204, another copy of the session key is delivered to consumer 216 using a key agreement algorithm (e.g., Elliptic Curve Diffie-Hellman).

After receiving and storing the TGT, consumer 216 is ready to start requesting streaming content on this network. A TGS_REQ message containing the TGT is sent to KDC 204 (TGS server 209) requesting a ticket for caching server 215. It should be noted that consumer 216 might perform additional provisioning actions, such as subscribe to a particular content provider. Also, consumer 216 may create a list of preferred caching servers.

Responsive to the TGS_REQ message, a TGS_REP message having the caching server ticket is transmitted to consumer 216 from KDC 204. If there are additional preferred caching servers, consumer 216 may contact KDC 204 to obtain caching server tickets for the preferred caching servers using the TGT. These caching server tickets may then be cached for later use. Otherwise, the caching server tickets are obtained at the time of requesting the content from the appropriate caching server.

For some consumers, KDC 204 first needs to query provisioning server 220 for subscriber authorization data before issuing the caching server tickets. This is accomplished with an AUTH_DATA_REQ/AUTH_DATA_REP exchange between KDC 204 and the provisioning server 220. The user authorization data is insertable into the tickets. The caching server ticket has the same format as the TGT—it includes a session key used for authentication to the caching server 215. The private part of the ticket is encrypted with caching server 215's service key known only to it and KDC 204. The ticket is also authenticated with a hash that is keyed with the same service key. As is the case with the TGT, consumer 216 is not able to modify this ticket. Consumer 216 needs the session key from the caching server ticket to authenticate itself to this server. A copy of this session key is delivered to consumer 216, encrypted with the TGT session key.

This process beginning with the AS_REQ message to the TGS_REP message corresponds to the generic phase noted above wherein a client is in contact with KDC 204 to obtain a server ticket to access the server. Because it is generic, the same process is used to secure other interfaces for delivery of content from content provider to caching servers; reporting of usage; billing, etc. Further, this results in a more secure IPRM system without the need for unnecessary or complex options. Moreover, because of the reduction in complexity, problems are identified and rectified in an expeditious fashion.

Upon receiving the TGS_REP message containing the caching server ticket, a KEY_REQ message with the ticket is sent to caching server 215. The KEY_REQ message contains a MAC (message authentication code) of the message, DOI (domain of interpretation) object and a time stamp in addition to the caching server ticket. A DOI object is for carrying application specific information associated with this secure session. In the present embodiment, the DOI object contains session rights information for consumer 216. The reason for encapsulating the session rights into this DOI object is because the session rights are specific to this particular content delivery architecture (with caching servers), while the ESBroker protocol provides generic key management services. ESBroker could be applied to other types of secure sessions, with their application-specific information also encapsulated in the DOI object.

When caching server 215 receives the generic KEY_REQ message, it extracts the non-generic DOI object. Caching server 215 then checks application specific code for streaming, for example, verifies the DOI object, and authorization information. If the session rights matches the authorization data in the ticket, a KEY_REP message containing a session key is forwarded to consumer 216. From that point, both sides have a protocol key and can start encrypting their final messages such as streaming content. If authorization fails, an error message is forwarded to the consumer. It should be noted that in some instances, the KEY_REP message contains a generic DOI object where caching server 215 needs to return some application specific information to consumer 216. For example, in the IPRM system, when the caching server sends a Ticket Challenge to the content provider to request a secure session, the session ID is provided later by the caching server, inside the DOI object in the KEY_REP message. The Ticket Challenge message is not authenticated and therefore does not contain a DOI object.

This phase (KEY_REQ/KEY_REP) corresponds to the non-generic phase in which the client uses the server ticket to form a key request to the server. This phase is non-generic because the DOI object varies depending on the interface being secured. For example, the DOI object relating to delivery of content from content provider to caching servers is different from that employed for delivery of the same content from a caching server to subscribers.

Figure 4:
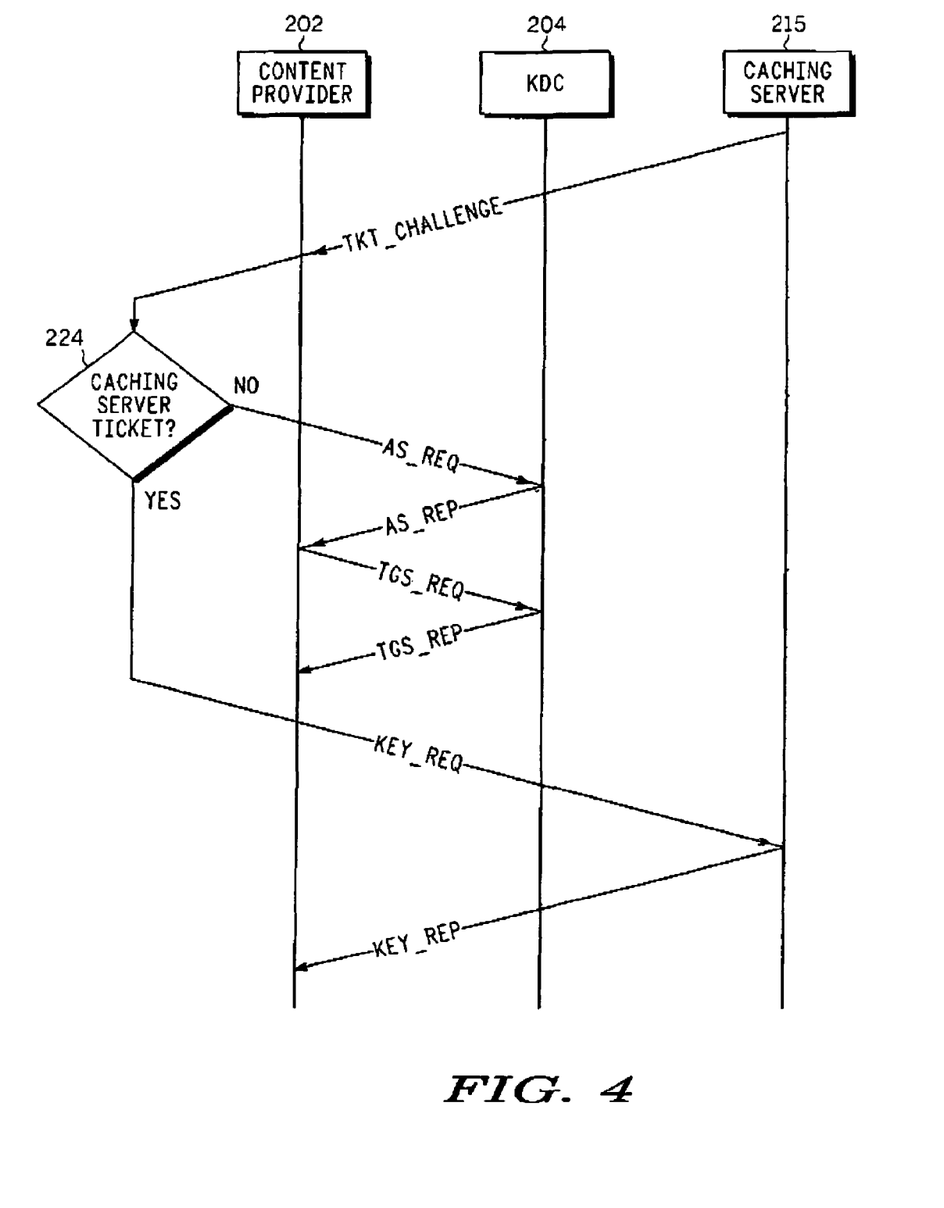
FIG. 4 is a high-level flow diagram of the security and key management protocol when key management is initiated from a caching server (server) to a content provider (client) in accordance with an exemplary embodiment of the present invention.

FIG. 4 is a high-level flow diagram of the security and key management protocol when key management is initiated from caching server 215 (server) to content provider 202 (client) in accordance with an exemplary embodiment of the present invention.

Key management is initiated by caching server 215 when a request for content is received and caching server 215 does not have the requested content. As shown, key management is initiated by sending a TKT_CHALLENGE (ticket challenge) message from the caching server 215 to content provider 202. The TKT_CHALLENGE is for use by a server to direct a client to initiate key management.

At decision block 224, if content provider 202 has a previously obtained caching server ticket, it forwards a KEY_REQ message containing the ticket to caching server 215. In response, caching server 215 sends a KEY_REP message as previously discussed above. On the other hand, returning to decision block 224, if content provider 202 has no caching server ticket and no TGT, it sends an AS_REQ message to KDC 204 which replies with an AS_REP message. If the content provider has its TGT the AS_REQ/REP is skipped.

Thereafter, content provider 202 sends a TGS_REQ message to KDC 204, and receives a TGS_REP message containing the caching server ticket. When the caching ticket is obtained, content provider 202 sends a KEY_REQ message in this case with no DOI object, since the session ID is included in the KEY_REP. Alternatively, the content provider could also generate the session ID and include it in the DOI object in the KEY_REQ message. Session rights don't apply since neither content provider 202 nor caching server 215 is a consumer. Once the shared key is established, SEC_ESTABLISHED message (not shown) is sent to caching server 215 by content provider 202. Since the server initiated key management, the SEC_ESTABLISHED message informs the server that security has been established.

Advantageously, it should be observed that the same messages namely TKT_CHALLENGE, AS_REQ/AS_REP, TGS_REQ/TGS_REP, KEY_REQ/KEY_REP, SECURITY_ESTABLISHED are used in multiple protocols and scenarios depending on whether a client or server initiates key management. If the server requests key management, all of the messages are used including the TKT_CHALLENGE message. Contrawise, if the client initiates key management all messages other than the TKT_CHALLENGE are employed. It should be observed that the Security Established message is also commonly skipped when client initiates key management. Advantageously, because a single key management protocol is utilized on all interfaces, it is easier to analyze whether the system is secure. In addition, the system secures both streaming content and non-streaming content including billing data with the same key management with changes only to the DOI object field.

Figure 5:
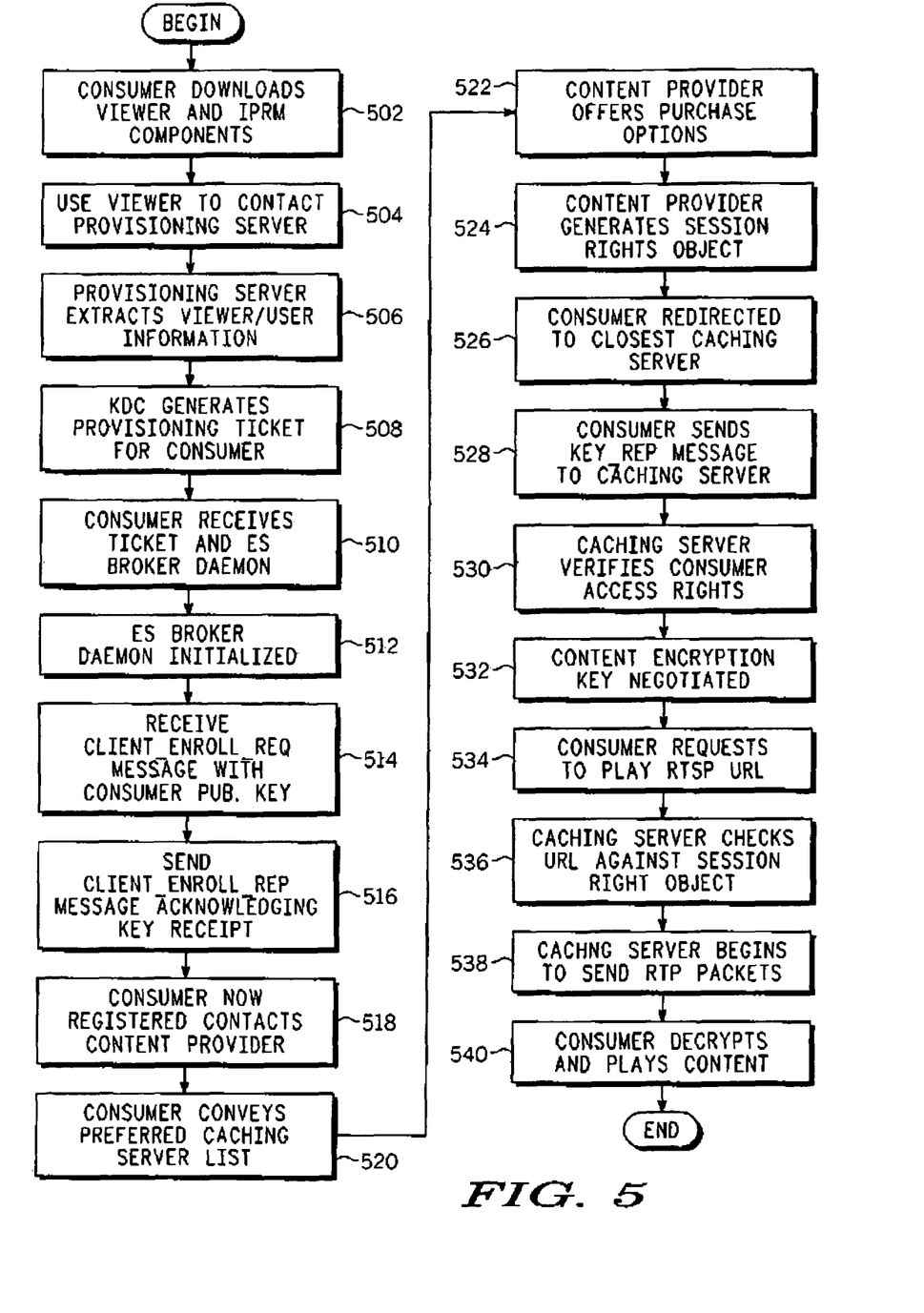
FIG. 5 is a block diagram illustrating initial registration and the receipt of content by a consumer in accordance with an exemplary embodiment of the present invention.

FIG. 5 is a block diagram illustrating initial registration and the receipt of content by consumer 216 in accordance with an exemplary embodiment of the present invention.

A new consumer 216 wishing to receive content from caching server 215 may initially sign up with central unit 218.

At block 502, consumer 216 using a web browser accesses a web site (not shown) provided by central unit 218. Consumer 216 comes to the initial sign-up and software download page, downloads and installs a viewer application, including any IPRM components. Alternatively, the viewer application and IPRM components could be distributed to consumers with removable media, such as a CD-ROM.

At block 504, consumer 216 starts up the viewer to initiate an SSL (secured socket layer) session with provisioning server 220. The session is initiated using a central unit 218 certificate (not shown). The certificate is the signed public key of the central unit 218 previously obtained by consumer 216. After the SSL session begins, consumer 216 fills out the initial signup form, which includes a form for a user ID. Or, the user ID can be automatically assigned by the central unit. Consumer 216 next determines a local host identifier and sends it to provisioning server 220 along with other information. (This is done transparently by the viewer).

At block 506, provisioning server 220 extracts the user ID and converts it to an ESBroker™ principal name. A principal name is a uniquely named consumer or server instance that participates in IPRM system 200. In this case, the viewer principal name is the same as a subscriber id assigned to that viewer. After the user ID is converted to an ESBroker™ principal name, provisioning server 220 sends a command to KDC 204 to generate a new ESBroker™ principal in KDC 204 database (not shown). This command also includes a consumer 216 host identifier.

At block 508, KDC 204 generates a provisioning ticket containing a provisioning key (session key) for consumer 216. The provisioning key may be a symmetric key in one embodiment of the present invention. The provisioning key is used by KDC 204 for authentication of messages between itself and consumer 216. Thereafter, the provisioning ticket is returned to provisioning server 220 along with an SKS (Session Key Seed). Because consumer 216 has no access to the provisioning key (encrypted with a KDC 204 key), the SKS is used by consumer 216 to reconstruct the provisioning key located within the provisioning ticket.

At block 510, in addition to the provisioning ticket, configuration parameters including the user ID, ticket expiration time (already included in the non-encrypted part of the ticket), KDC 204 name and/or address etc. and (optionally) software components including an ESBroker™ daemon are downloaded by consumer 216. It should be observed that the software components might have been downloaded pervious to this registration procedure, as is the case in the Aerocast network.) Thereafter, the SSL connection is terminated.

At block 512, the ESBroker™ daemon is initialized using the downloaded configuration parameters.

At block 514, a public/private key pair for authenticating AS_REQ messages between consumer 216 and KDC 204 is generated. The public key is forwarded to KDC 204 from consumer 216. This is accomplished using a CLIENT_ENROLL_REQ message. The message contains the public key (symmetrically) signed with the provisioning key derived from the SKS by consumer 216. Since there is no access to the provisioning key within the provisioning ticket, consumer 216 derives the provisioning key from the SKS using a one-way function. The problem with distributing tickets and provisioning keys to software clients is that a software client may copy the ticket and key for forwarding to an unauthorized software client. To address this problem, consumer 216 receives the SKS instead of the actual provisioning key. Combining SKS with a unique host identifier using a one-way function generates the provisioning key. The SKS is specific to a particular host and can't be used anywhere else. In the present embodiment, consumer 216 executes the following function to reproduce the provisioning key:

Provisioning key=SKGen (Host ID, SKS)

Where SKGen ( ) is a one-way function; $SKGen^{-1}$ ( ) cannot be calculated within reasonable amount of time (e.g. in less than the ticket lifetime).

At block 516, upon receiving the CLIENT_ENROLL_REQ message, KDC 204 finds consumer 216 in its local database to verify the request. If the request is valid, KDC 204 stores the public key either in a client database that could be located locally on the KDC or at some other remote location with secure access. Alternatively, KDC 204 may generate a certificate with the public key for forwarding to consumer 216. A message CLIENT_ENROLL_REP acknowledging the key has been stored (or alternatively containing a client certificate) is then forwarded to consumer 216.

At block 518, consumer 216 is now enrolled and may contact a web site (not shown) with a database 208 having a listing a content from various providers including content provider 202. When the desired content is located, consumer 216 gets redirected to content provider 202.

At block 520, consumer 216 then contacts content provider 202 to which it was redirected and conveys its preferred list of caching servers, list of subscribed services, its ability to pay for content, etc.

At block 522, content provider 202 offers an optimized subset of purchase options that depend upon the context of the particular consumer and service. For example, price selection screens may be bypassed for consumers already subscribed to this service.

At block 524, content provider 202 generates a session rights object that encapsulates the purchase options selected by consumer 216, an optional set of content access rules (e.g., blackout regions) and a reference to the selected content. For example, a session ID which is a random number that was generated by consumer 216 when it requested these session sights from the content provider. An End Time after which these session rights are no longer valid, a ProvideriD, PurchaseOption selected by consumer 216, etc. Optionally, session rights objects may contain content rules. Alternatively, these rules may be delivered to a caching server using some out of band method.

At block 526, content provider 202 redirects consumer 216 to the appropriate caching server. In this case, content will be streamed from caching server 215 which is closest to consumer 216. If consumer 216 had previously cached a caching server ticket for caching server 215 when it signed up, it retrieves that ticket. If it has no cached ticket, it contacts KDC 204 using a TGT to obtain the correct caching server ticket.

At block 528, consumer 216 authenticates itself to caching server 215 using the caching server ticket, and at the same time (in the same KEY_REQ message) forwards the session rights object obtained from content provider 202 to caching server 215. Communication between consumer 216 and caching server 215 is accomplished using the KEY_REQ/KEY_REP messages, above.

At block 530, caching server 215 checks the access rules from the session rights object against the consumer's entitlements and against the user selection (purchase option selected by the consumer) in the session rights object. The entitlements are basically authorization data specific to consumer 216 which allows access to content. The set of content access rules is optional because it might have been delivered directly to caching server 215 with the content. Furthermore, caching server 215 can optionally gather additional content access rules from multiple sources. For example, an access network provider (e.g. cable system operator) might impose some restrictions for delivery over its network.

At block 532, if access is approved, consumer 216 and caching server 215 negotiate a Content Encryption Key (CEK) for delivery of the content.

At block 534, security parameters for securing communications during the streaming session are established. Among other parameters, the security parameters include MAC (message authentication code) and content encryption keys, the derivation of which is discussed under "Key Derivation," below. A session identifier associated with the security parameters is also established. When consumer 216 starts issuing RTSP commands to the caching server 215 to get description of the content (RTSP URL), and to request to play the content, the RTSP message is secured with the security parameters.

At block 536, caching server 215 receives RTSP commands, decodes them and returns encrypted RTSP responses. When an RTSP command requests to play a specific URL, caching server 215 verifies that the specified URL is what was specified in the session rights object for this secure session, identified by the Session identifier.

At block 538, after receiving a request to play an RTSP URL, caching server 215 establishes a streaming session and begins to send out RTP packets. Both caching server 215 and consumer 216 periodically send RTCP report packets. All RTP and RTCP packets are encrypted with the security parameters. Further, the RTP and RTCP packets associated with the same RTSP URL are encrypted using the same Session ID, the Session ID that was recorded when caching server 215 started receiving encrypted RTSP messages from consumer 216. It should be observed that the RTSP, RTP and RTCP messages may be exchanged in any order, each message being secured with the security parameters which are identifiable with the session identifier.

At block 540, consumer 216 decrypts and plays the content. At the same time, consumer 216 may issue additional RTSP commands (e.g. to pause or resume content play out), still encrypted using the same Session ID. Caching server 215 keeps track of who viewed the content, how long the content was viewed, and under what mechanism the content was purchased.

Streaming and Non-Streaming Content

There are two basic categories of content that are protected: streaming and non-streaming content. The following protocols are used to deliver either the actual streaming content or information related to the content: RTP (real time protocol)/RTCP (real time control protocol), RTSP (real time streaming protocol). Streaming Description: RTSP with SDP (session description protocol). Other Non-Streaming Content: RTCP, HTTP (provisioning, content publishing to the directory); Custom protocols over either TCP (transport control protocol) or UDP (user datagram protocol) (content usage reporting). Streaming Content: in standards-based systems, the streaming content is typically delivered using the RTP. There are additional proprietary streaming protocols such as Real and Microsoft's Windows Media that can also be secured with this IPRM system.

RTP Security Services

Authentication, encryption and message integrity are implemented to ensure that unauthorized parties are unable to stream or view paid content and to make it difficult to disrupt streaming sessions.

RTP Cryptographic Mechanisms

Each media RTP packet is encrypted for privacy. The two end-points have an ability to negotiate a particular encryption algorithm as defined by the system configuration and controlled by the server. Encryption is applied to the packet's payload. header consists of 12 or more octets. The RTP header has the RFC-1889 format. The first twelve octets are present in every RTP packet, while the list of CSRC identifiers is present only when inserted by a mixer.

RTP Packet Encoding

Each packet may be encoded using the following procedure: The sender looks up the Session ID for this packet. The lookup could be based on the SSRC (RTP Synchronization Source) or on the destination IP address and UDP port. (In the case of point-to-point delivery, the Session ID is a random number, unique at both endpoints of the connection.) The Session ID in turn identifies a set of security parameters for encrypting this packet. These parameters are: (1) EK-RTP encryption key. This encryption key is only used to encrypt traffic in one direction (e.g., always from the Caching Server to its consumer 216s). In the IPRM system there are no bi-directional RTP sessions and therefore there is only one RTP encryption key per session. Initialization Vector (IV) is automatically generated by taking a SHA-1 hash of the RTP packet header. In a first aspect, the packet body, not including the RTP header is encrypted using the selected block cipher in CBC mode. In one embodiment, the Rijndael cipher is used. Rijndael operates on 128-bit blocks.

RTP Packet Decoding

Each packet is decoded using the following procedure: The receiver looks up the Session ID for this packet. The lookup could be based on the SSRC (RTP Synchronization Source) or on the source IP address and UDP port. (In the case of point-to-point delivery, the Session ID is a random number, unique at both endpoints of the connection.) The Session ID in turn identifies a set of security parameters for decrypting this packet. These parameters are: EK-RTP encryption key. Initialization Vector (IV) is automatically generated by taking a SHA-1 hash of the RTP packet header. It should be observed that because each RTP packet contains a different sequence number or timestamp, it results in a unique IV per packet. The rest of the data in the RTP header doesn't change much but is included in the hash for convenience—since a SHA-1 hash operates on 512-bit blocks.

RTSP Encoding

If encoded RTSP messages are directly received by a proxy that immediately decodes them, they may be encoded in binary. However, if RTSP messages are forwarded by some intermediate HTTP relay agent, they may be printable ASCII-encoded. The binary encoding of the RTSP messages is identical to that of the encoding of RTCP messages. In the case that a printable ASCII encoding is required, the RTSP binary encoding is then base-64 encoded. An RTSP Packet is encoded as follows: Create a binary encoding using a procedure identical to the one for RTCP packets. If printable ASCII is required, base-64 encode the binary encoding. Insert a <CR><LF> after each 80 characters of the base-64 encoding. If the last line is less than 80 characters long, append another <CR><LF> at the end.

RTSP Message Decoding

Each encoded RTSP Message is decoded as follows: If the RTSP message is base-64 encoded, first remove the <CR><LF> characters and then base-64 decode the ASCII message into a binary encoding. Decode the binary encoding exactly the same as for an RTCP packet. In some cases, a client (e.g. viewer) is required to obtain the Session Rights for receiving this content from a $3^{rd}$ party (the Origin Server). In these cases, the client would have passed its Session Rights for the content inside the DOI Object in the Key Request message. For point-to-point delivery, the RTSP protocol itself is generally used to request the streaming of a particular content, identified with an RTSP URL. The RTSP client software should verify that the RTSP URL requested with a secure RTSP message does in fact correspond to the RTSP URL in the Session Rights associated with that secure session (identified with a Session ID).

TABLE 2

An encoded RTCP packet includes the following fields:

| Field | Description |
| --- | --- |
| Session ID | Identifies a set of security parameters. |
| Sequence Number | Normally this value would increase with each packet sent. It is used to detect replays. |
| Encrypted RTCP message | Encryption of the original RTCP message. |
| IV | Initialization Vector in the case that the encryption algorithm is a block cipher. |
| MAC | Message Authentication Code, calculated over the whole message after encryption. |

RTCP Packet Encoding

Each packet is encoded using the following procedure: The source IP address and UDP port are used to look up the Session ID for this packet. (In the case of point-to-point delivery, the Session ID is a random number, unique for both endpoints of the connection.) The Session ID in turn identifies a set of security parameters for encrypting this packet. These parameters are: EK—media stream encryption key (same as for RTP), $K_{MAC}$—message authentication key.

Next, determine the sequence number. For example, it may be 0 for the first RTCP message sent with the current security parameters and incremented by 1 after that. Next, if a block cipher in CBC mode is used for encryption, generate a random Initialization Vector (IV) with the size the same as the cipher block size. Next, encrypt the RTCP message, using the selected encryption algorithm. For example, Rijndael cipher may be used in CBC mode. Rijndael operates on 128-bit blocks. If the last block is shorter than that, RBT (Residual Block Termination) processing may be used in order to avoid padding and therefore to save bandwidth. Thereafter, put together the encoded RTCP message with the exception of the MAC, and calculate the MAC over the RTCP message and append it to the same message.

RTSP/RTCP Header Encryption

According to one aspect of the present invention the entire payload and header of the RTCP packets are encoded when real-time data is streamed to protect client viewing preferences from snooping. For example, the RTSP header for each payload contains content identification (RTSP URL) for the content that is being requested or played out. By encoding the entire payload and header, the user's viewing patterns are protected. The RTSP and RTCP packets are encoded using the aforementioned procedures. The procedure occurs at the application layer although it may occur at lower layers as well. After each packet is encoded, a new header is provided for each RTCP and RTSP message. Of course, the new header is unencrypted and contains one or more of the fields having the attributes listed above. For example, a session identifier, a sequence no., an IV and/or a MAC calculated over the entire message may be contained within the new header. Further, each of the headers are provided using an identical format.

RTCP Packet Decoding

Each packet is decoded using the following procedure: The Session ID in the header is used to look up a set of security parameters for decrypting this packet. These parameters are: EK—media stream encryption key (same as for RTP) $K_{MAC}$—message authentication key. Calculate a MAC over the encoded message, not including the MAC field itself. Verify that the calculated MAC matches the value in the encoded message. If they don't match, abort further decoding and report an error. Verify the sequence number as specified in the subsection below. If verification fails, the message is rejected as a replay. Decrypt the encrypted RTCP message, using the selected encryption algorithm, such as a block cipher in CBC mode. The IV for this message is included in the encoded message.

Sequence Number Verification

There are two cases for sequence number verification: when the message is received via UDP and when it is received via TCP. Although RTCP messages are always sent over UDP, the same message decoding rules apply to protocols other than RTCP. Therefore we describe here both cases—even though the TCP transport does not apply to RTCP.

Sequence Number Verification for Application Messages Sent Over TCP

The sequence number of a received message must be greater than the sequence number of the previously received message. The receiver must accept a message when the sequence number had increased by more than one from the previous message. (This scenario might occur if the receiver's internal buffer were to overflow and loose some incoming messages before they were processed.)

Sequence Number Verification for Application Messages Sent Over UDP

The sequence number is verified using a sliding window protocol: The size of the sliding window W depends on the reliability of the UDP transport and is locally configured at each endpoint. W should be 32 or 64. The sliding window is most efficiently implemented with a bit mask and bit shift operations. Before the receiver processes the first packet in a UDP stream from a secure session, the first sequence number in the sliding window is initialized to 0 and the last one is W−1. All sequence numbers within the window are accepted the first time and are rejected when they are repeated. All sequence numbers that are smaller than the "left" edge of the window are rejected. When an authenticated packet with a sequence number that is larger than the "right" edge of the window is received, that sequence number is accepted and the "right" edge of the window is replaced with this sequence number. The "left" edge of the window is updated in order to maintain the same window size. When for a window (SRIGHT−W+1, SRIGHT), sequence number SNEW is received and SNEW>SRIGHT, then the new window becomes: (SNEW−WRTCP+1, SNEW).

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method for securely streaming real-time content from a caching server to an authorized client, the method comprising:
  encrypting an RTSP (real-time streaming protocol) message having a header and a payload, the RTSP message being encrypted in its entirety;
  providing a first clear header for the encrypted RTSP message;
  encrypting an RTCP (real-time control protocol) message having a header and a payload, the RTCP message being encrypted in its entirety;
  providing a second clear header for the encrypted RTCP message;
  transmitting the encrypted RTSP message and the first clear header; and
  transmitting the encrypted RTCP message and the second clear header in order to securely stream the real-time content from the caching server to the authorized client.

2. The method of claim 1 further comprising
  decrypting the encrypted RTSP message by
    retrieving an identifier from the first clear header, the identifier for identifying one or more cryptographic keys; and
    using the cryptographic keys for decrypting the RTSP message.

3. The method of claim 1 further comprising
  decrypting the encrypted RTCP message by
    retrieving an identifier from the second clear header, the identifier for identifying one or more cryptographic keys; and
    using the cryptographic keys for decrypting the RTCP message.

4. The method of claim 1 further comprising
  generating an identifier for identifying one or more parameters for securing the RTSP and the RTCP messages.

5. The method of claim 1 wherein the header for the RTSP message and the header for the RTCP message are encrypted to prevent unauthorized access to user viewing patterns contained therein.

6. The method of claim 1 further comprising authenticating all control messages to prevent attacks intended to modify the control messages.

7. The method of claim 4 wherein both the first clear header and the second clear header includes the identifier.

8. A communication system for streaming real-time content from a caching server to an authorized client, the system comprising: a caching server; a client for receiving the content from the caching server; an RTSP (real-time streaming protocol) message, the RTSP message including its header and payload being encrypted at an application layer to form an encrypted RTSP message; an RTCP (real-time control protocol) messages, the RTCP massage including its header and payload being encrypted at the application layer to form an encrypted RTCP message; and wherein the caching server and the client exchange one or more of said encrypted RTSP and RTCP messages for securing the streaming of the real-time content to the client; a first identifier for identifying the security parameters to decrypt the encrypted RTSP message; and a second identifier for identifying the security parameters to decrypt the encrypted RTCP message.

9. In a communication network employing RTP (real time protocol) for delivery of real-time data, a method of encrypting RTCP (real time control protocol) and RTSP (real time streaming protocol), the method comprising: determining two or more security parameters for securing delivery of the real-time data; at an application layer, using the security parameters for encrypting an entire payload and header of the RTSP and RTCP messages; and exchanging one or more of the RTSP and the RTCP message and the RTP message for securely delivering the real-time data; providing a clear header having an identifier for identifying the security parameters.

10. The method of claim 9 wherein the clear header further comprises
a sequence number for preventing replay of prior RTSP and RTCP messages.

11. The method of claim 9 wherein the security parameters comprise
a MAC (message authentication code) key for authenticating the RTSP and RTCP messages; and
an encryption key for encrypting the RTSP and RTCP messages.

12. The method of claim 11 further comprising
establishing a session identifier associated with the MAC key and the encryption key.

13. The method of claim 11 further comprising
using the session identifier to determine The MAC key and the encryption key.

14. The method of claim 9 wherein the security parameters further comprises
a first encryption key for encrypting outbound messages;
a second key for authenticating outbound messages;
a third encryption key for inbound messages; and
a fourth encryption key authenticating inbound messages.

15. In a communication network, a method for securing a real time data stream between two computing devices, the method comprising:
exchanging one or more RTSP messages having a header and payload;
exchanging one or more RTCP messages having a header and payload;
encrypting an entire header and payload of the RTSP messages to produce a first encrypted packet;
encrypting an entire header and payload of the RTCP messages to produce a second encrypted packet;
providing a first header forte first encrypted packet by using a format, the first header having an identifier for identifying the security parameters to decrypt the RTSP messages;
providing a second header for the second encrypted packet, the second header having an identifier for identifying the security parameters to decrypt the RTCP messages; and
the second header being provided using the format identical to that of the first header.

16. The method of claim 15 wherein encryption of the RTSP message is at an application layer.

17. The method of claim 15 further comprising
providing a session identifier, and a sequence number and an initialization vector.

* * * * *